US006980426B2

(12) United States Patent
Kim

(10) Patent No.: US 6,980,426 B2
(45) Date of Patent: Dec. 27, 2005

(54) TABLET MONITOR

(75) Inventor: Dae-jin Kim, Kunpo (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 10/851,205

(22) Filed: May 24, 2004

(65) Prior Publication Data

US 2005/0030706 A1 Feb. 10, 2005

(30) Foreign Application Priority Data

Aug. 4, 2003 (KR) ...................... 10-2003-0053835

(51) Int. Cl.[7] ................................................ G06F 1/16
(52) U.S. Cl. ...................... 361/683; 361/681; 248/688; 248/917
(58) Field of Search ................................ 361/681–683, 361/686; 248/917–924, 688; 345/169, 905; 312/223.1, 223.2; 353/119–122

(56) References Cited

U.S. PATENT DOCUMENTS

| | | | | |
|---|---|---|---|---|
| 5,100,098 | A * | 3/1992 | Hawkins | 248/291.1 |
| 5,870,280 | A | 2/1999 | Cho | |
| 6,301,101 | B1 * | 10/2001 | Anzai et al. | 361/683 |
| 6,343,006 | B1 | 1/2002 | Moscovitch et al. | |
| 2004/0052037 | A1 * | 3/2004 | Sawyer | 361/681 |

FOREIGN PATENT DOCUMENTS

| | | |
|---|---|---|
| JP | 6-195150 | 7/1994 |
| JP | 11-212671 | 8/1999 |
| JP | 2001-51750 | 2/2001 |
| JP | 2002-171461 | 6/2002 |
| KR | 1999-24544 | 7/1999 |
| KR | 1999-41572 | 12/1999 |
| KR | 2001-83865 | 9/2001 |
| KR | 20-259724 | 12/2001 |
| KR | 2002-62624 | 7/2002 |

* cited by examiner

*Primary Examiner*—Lynn Feild
*Assistant Examiner*—Anthony Q. Edwards
(74) *Attorney, Agent, or Firm*—Staas & Halsey LLP

(57) ABSTRACT

A tablet monitor includes a monitor main body having a connector combining part and a handle accommodating part, a handle foldably accommodated in the handle accommodating part of the monitor main body, and a supporting stand connected to a rear of the monitor main body, and including a connector connected to a connector combining part of the monitor main body. The tablet monitor also includes a first connector having two parts, each provided at the handle and the supporting stand, and each having a shape to correspond to each other to be detachably connected to each other, and a second connector having two parts, each provided at the monitor main body and at the supporting stand, and each having a shape to correspond to each other to be detachably connected to each other. Thus, the monitor main body and the supporting stand may be simply and firmly connected to each other, so that the tablet monitor is used with more convenience. Further, at the same time, when the monitor main body and the supporting stand are connected to each other, the handle may be connected to the monitor main body.

12 Claims, 7 Drawing Sheets

TABLET MONITOR

CROSS-REFERENCE TO RELATED APPLICATIONS

This application claims the benefit of Korean Patent Application No. 2003-53835, filed on Aug. 4, 2003, in the Korean Intellectual Property Office, the disclosure of which is incorporated herein by reference.

BACKGROUND OF THE INVENTION

1. Field of the Invention

The present invention relates to a tablet monitor, and more particularly, to a tablet monitor in which a monitor main body and a supporting stand is easily and firmly connected to and separated from each other.

2. Description of the Related Art

Generally, a tablet monitor is an inputting device mainly used for an interactive graphic. In the tablet monitor, a stylus or a hand cursor is moved on the monitor and a position thereof is transmitted to a computer main body.

The tablet monitor serves not only as a display to display a picture thereon, but also as a surface to write letters or to draw a picture thereon.

Thus, the tablet monitor becomes a general inputting device used in the field of CAD or graphic design.

A conventional tablet monitor includes a monitor main body provided with a connector combining part, a handle foldably connected to a rear of the monitor main body, and a supporting stand connected to the rear of the monitor main body, and including a connector connected to the connector combining part of the monitor main body.

The handle is used to be gripped by a user when the monitor main body is used without the supporting stand. If the monitor is used by being connected to the supporting stand, the handle is folded to prevent it from being unnecessarily moved.

However, the monitor main body and the supporting stand of the conventional tablet monitor are connected to each other only with the connector, so that the connection therebetween may be easily removed only by a small impact from the outside and the tablet monitor may be damaged.

SUMMARY OF THE INVENTION

Accordingly, it is an aspect of the present invention to provide a tablet monitor in which a monitor main body and a supporting stand are easily and firmly connected to each other.

Additional aspects and/or advantages of the invention will be set forth in part in the description which follows and, in part, will be obvious from the description, or may be learned by practice of the invention.

The foregoing and/or other aspects of the present invention are also achieved by providing a tablet monitor including a monitor main body having a connector combining part and a handle accommodating part, a handle foldably accommodated in the handle accommodating part of the monitor main body, a supporting stand connected to a rear of the monitor main body and including a connector connected to a connector combining part of the monitor main body, and a first connector including two parts, each provided at the handle and the supporting stand, and each having a shape to correspond to each other to be detachably connected to each other. The tablet monitor also includes a second connector having two parts, each provided at the monitor main body and at the supporting stand, and each having a shape to correspond to each other to be detachably connected to each other.

According to an aspect of the invention, the first connector includes a first connecting hole provided in a middle of the handle, and a first connecting protrusion provided on the supporting stand to be inserted in the first connecting hole.

According to an aspect of the invention, the first connector further includes a pin member provided inside of the handle and elastically moved according to whether the first connecting protrusion is inserted in the first connecting hole, to be selectively inserted in a pin supporting hole of the monitor main body.

According to an aspect of the invention, the pin member includes an elastic material provided inside of the handle and elastically moved according to whether the first connecting protrusion is inserted in the first connecting hole. The pin member also includes a supporting pin moved together with the elastic material, to be selectively inserted in the pin supporting hole of the monitor main body.

According to an aspect of the invention, the second connector includes a second connecting hole selectively provided at one of the monitor main body and the supporting stand, and a second connecting protrusion provided at the other of the monitor main body and the supporting stand, to be inserted in the second connecting hole.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
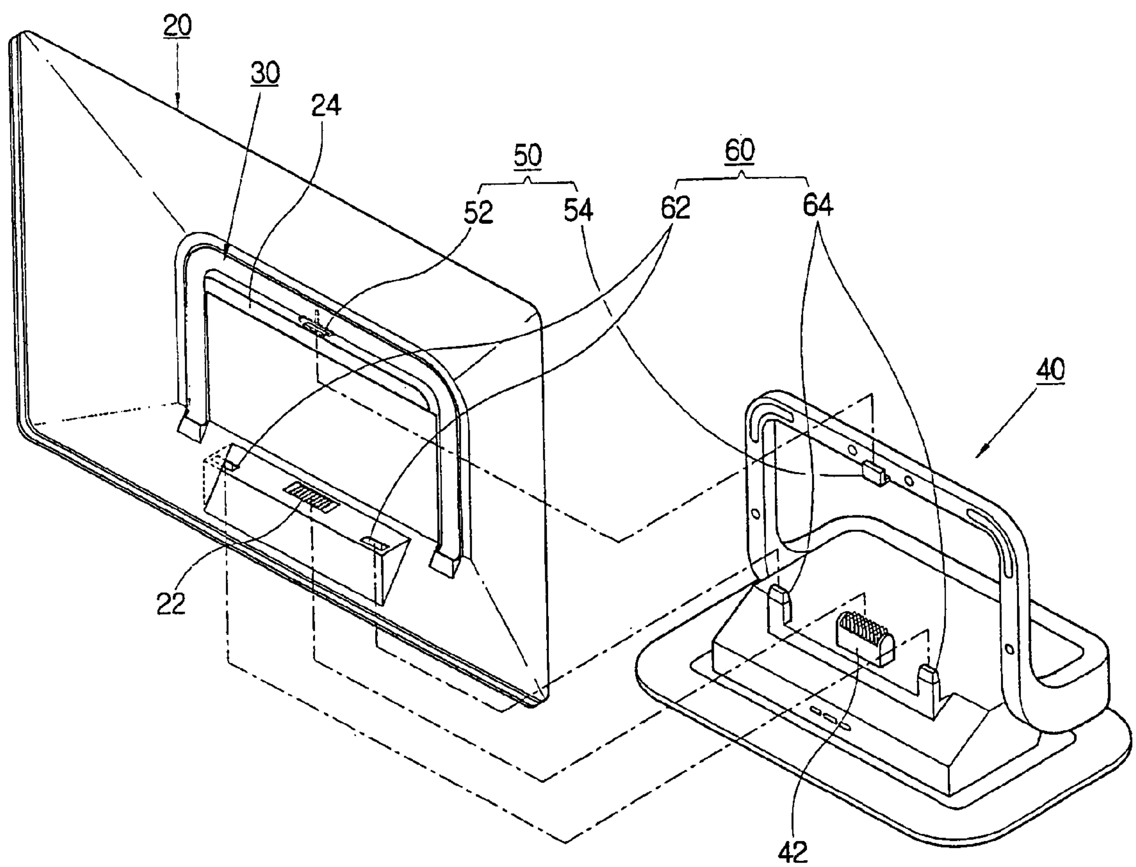
FIG. 1 is an exploded perspective view of a tablet monitor, according to an embodiment of the present invention.
Figure 2:
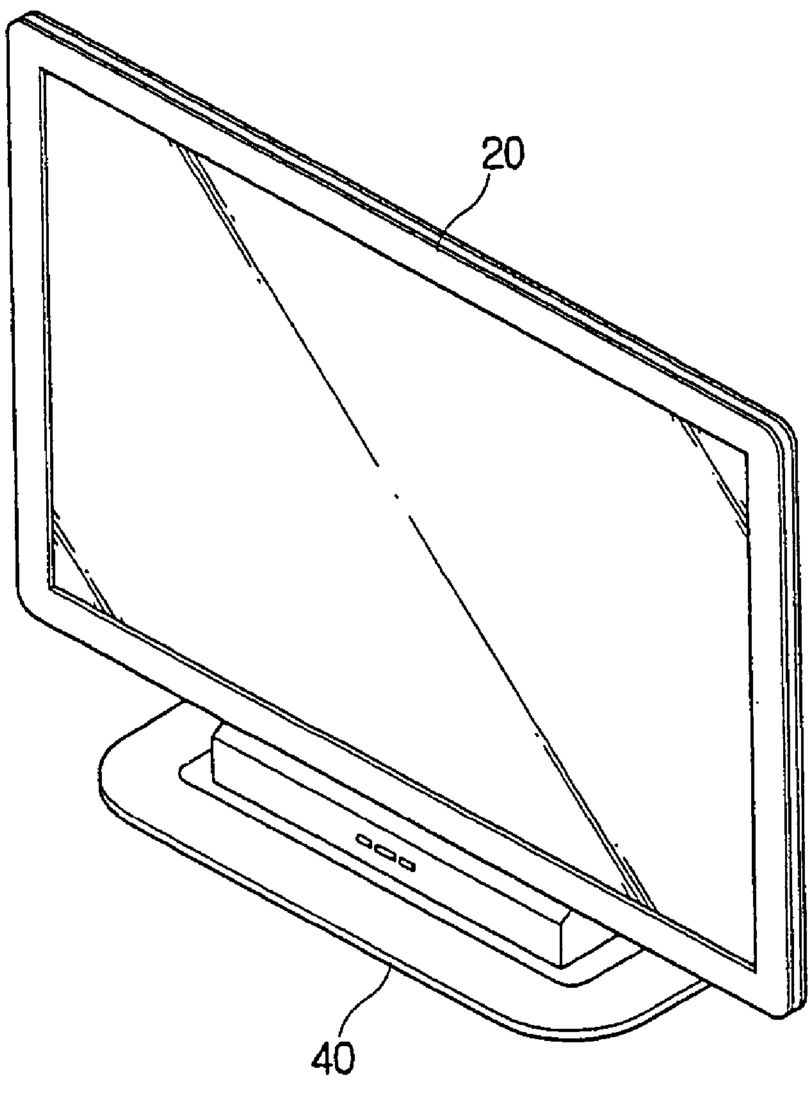
FIG. 2 is a combined perspective view of the table monitor in FIG. 1.
Figure 3:
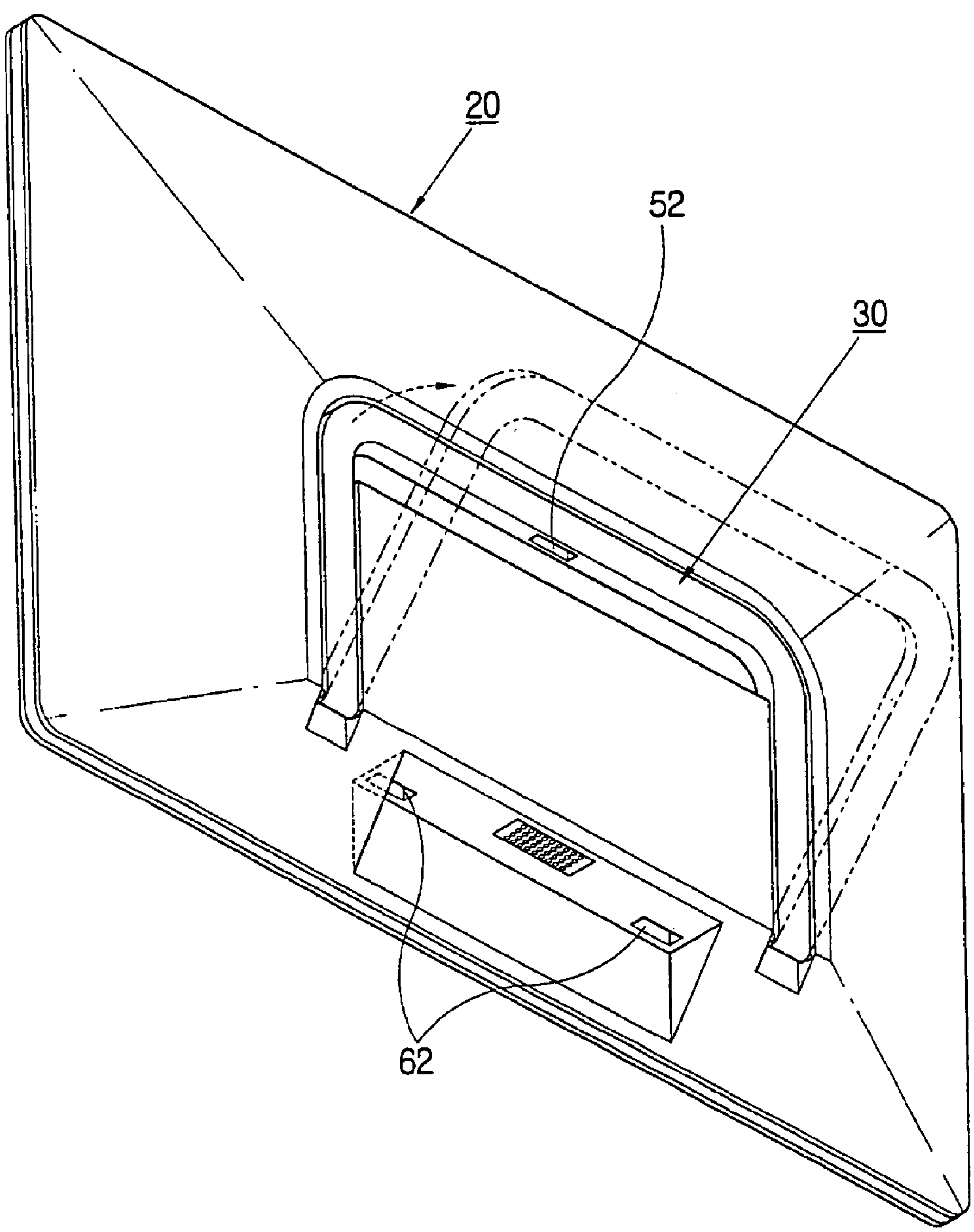
FIG. 3 is a perspective view showing how a handle of the tablet monitor in FIG. 1 is operated.
Figure 4A:
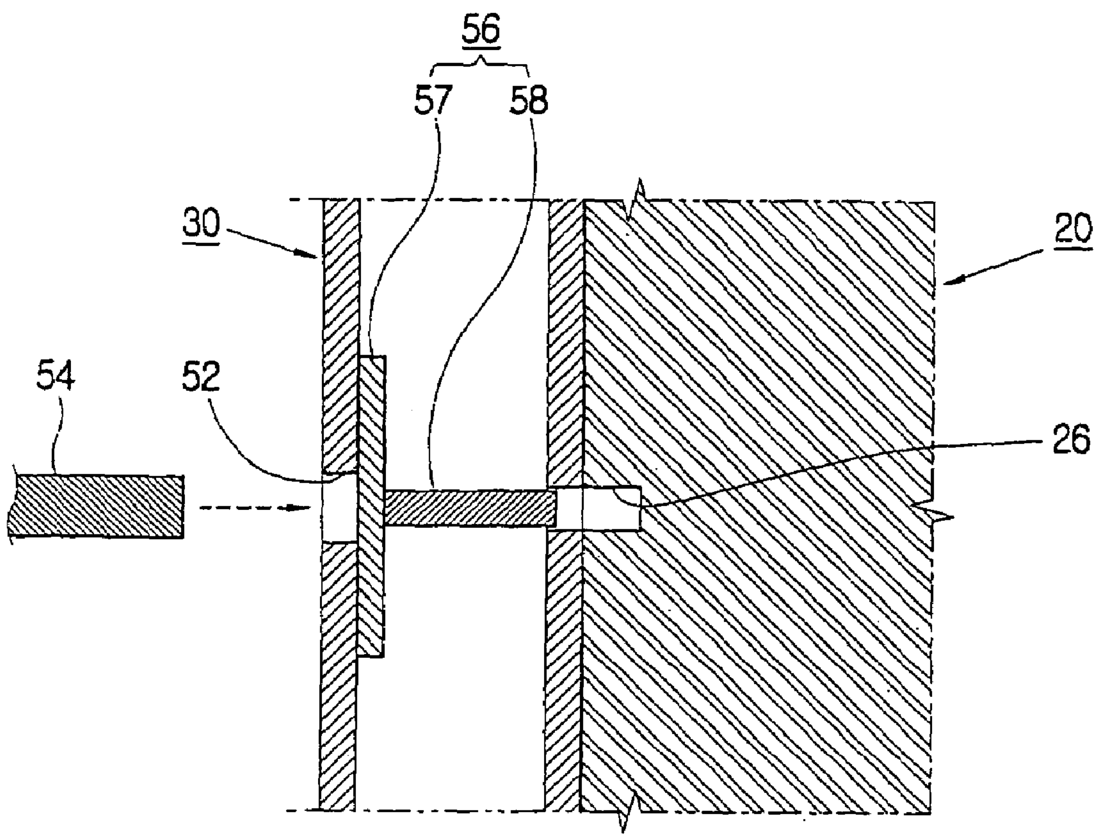
FIGS. 4A and 4B are partial sectional views showing how the tablet monitor in FIG. 1 is combined.
Figure 4B:
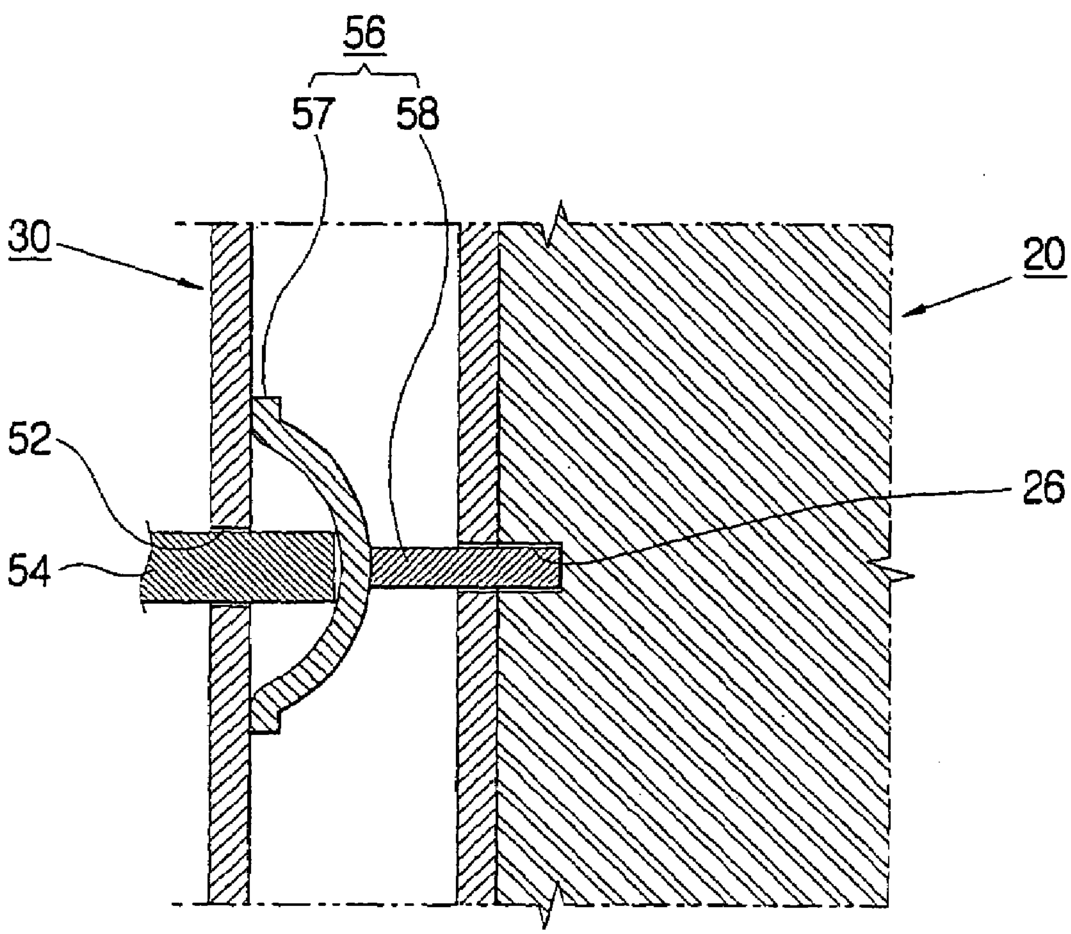

Reference will now be made in detail to the embodiments of the present invention, examples of which are illustrated in the accompanying drawings, wherein like reference numerals refer to like elements throughout. The embodiments are described below in order to explain the present invention by referring to the figures.

As shown in FIGS. 1, 2, 3, 4A, 4B, 5A and 5B, a tablet monitor, according to an embodiment of the present invention includes a monitor main body 20 including a connector combining part 22 and a handle accommodating part 24, a handle 30 foldably accommodated in the handle accommodating part 24 of the monitor main body 20, and a supporting stand 40 connected to a rear of the monitor main body 20 and provided with a connector 42, to be connected with a connector combining part 22 of the monitor main body 20. The tablet monitor also includes a first connector 50 having two parts, respectively provided at the handle 30 and the supporting stand 40, and each having a shape to correspond to each other to be detachably connected to each other. The tablet monitor includes a second connector 60 having two parts, respectively provided at the monitor main body 20 and at the supporting stand 40, and each having a shape to correspond to each other to be detachably connected to each other.

The monitor main body 20 serves not only as a display to display a picture thereon, but also as a surface to write a letter or to draw a picture thereon. The connector combining part 22 is provided on a bottom of a rear of the monitor main body 20, to be electrically connected with the connector 42 of the supporting stand 40. The handle accommodating part 24 is provided to correspond to a size and shape of the handle 30 to be accommodated therein, and with a pin supporting hole 26 in a middle thereof.

The handle 30 is positioned in a middle of the monitor main body 20, to be selectively folded or unfolded as the monitor main body 20 and the supporting stand 40 are connected to or detached from each other. That is, if the monitor main body 20 is detached from the supporting stand 40, the handle 30 is unfolded to be gripped by a user. If the monitor main body 20 is connected with the supporting stand 40, the handle is folded to be accommodated in the handle accommodating part 24. The handle 30 is selectively fixed on the monitor main body 20, as two parts of the first connector 50 are connected to or detached from each other (the two parts will be described in detail later with reference to a structure of the first connector 50).

The supporting stand 40 supports the monitor main body 20 and a structure of the supporting stand 40 may be varied as required.

The first connector 50 includes a first connecting hole 52 provided at a bottom of a middle of the handle 30, and a first connecting protrusion 54 provided on the supporting stand 40 to be inserted in the first connecting hole 52. The first connector 50 also includes a pin member 56 provided inside of the handle 30, to be elastically moved according to whether the first connecting protrusion 54 is inserted in the first connecting hole 52 or detached therefrom. The pin member 56 is selectively inserted in a pin supporting hole 26 of the monitor main body 20 as the first connecting protrusion 54 is inserted in the first connecting hole 52 or detached therefrom. Thus, the first connector 50 serves to connect the monitor main body 20 and the supporting stand 40 to each other, and to connect the handle 30 to the monitor main body 20.

The pin member 56 may be provided independently of the first connecting protrusion 54 and may be operated without regard to the first connecting protrusion 54.

The pin member 56 includes an elastic material 57 provided inside of the handle 30, and a supporting pin 58 provided at the elastic material 57, to be selectively inserted in the pin supporting hole 26 according to a movement of the elastic material 57 that moves according to whether the first connecting protrusion 54 is inserted in the first connecting hole 52. A structure of the pin member 56 may be varied as long as the pin member 56 may be elastically moved according to first connecting protrusion 54.

Alternatively to the elastic material 57, a variety of materials having elasticity may be used, but a plate spring having a simple structure and a high elasticity may preferably be used.

Figure 5A:
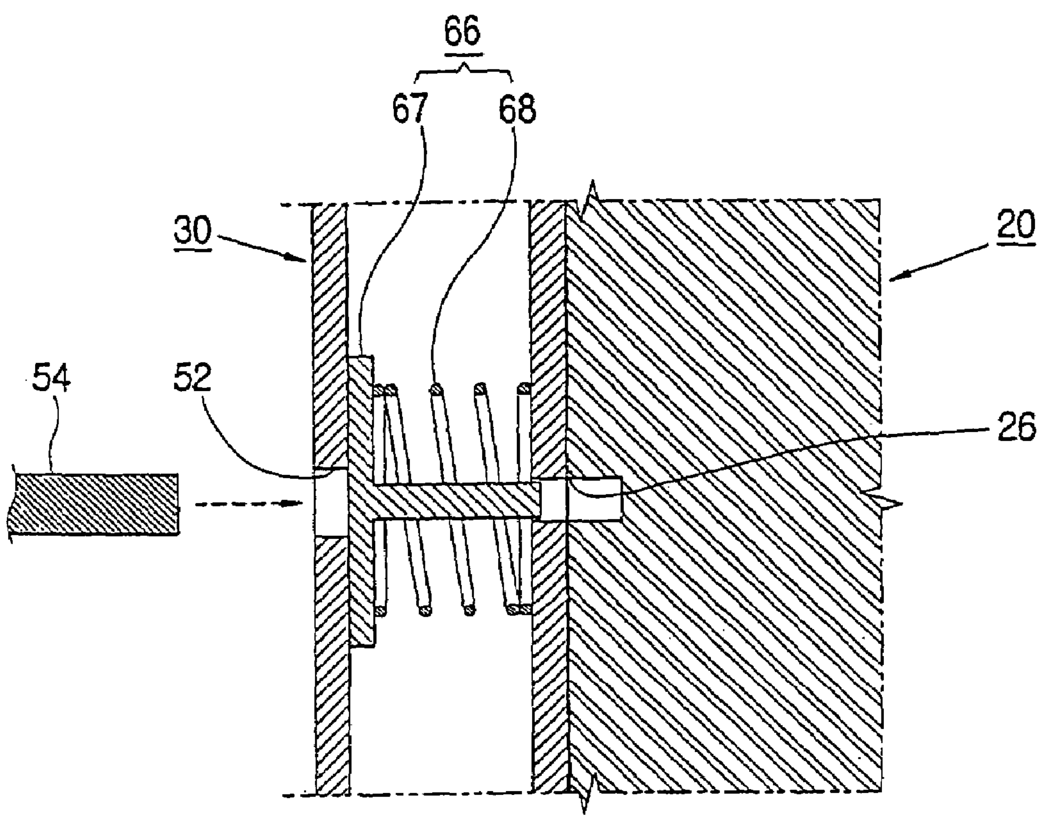
FIGS. 5A and 5B are partial section views showing how the tablet monitor in FIG. 1 is combined.
Figure 5B:
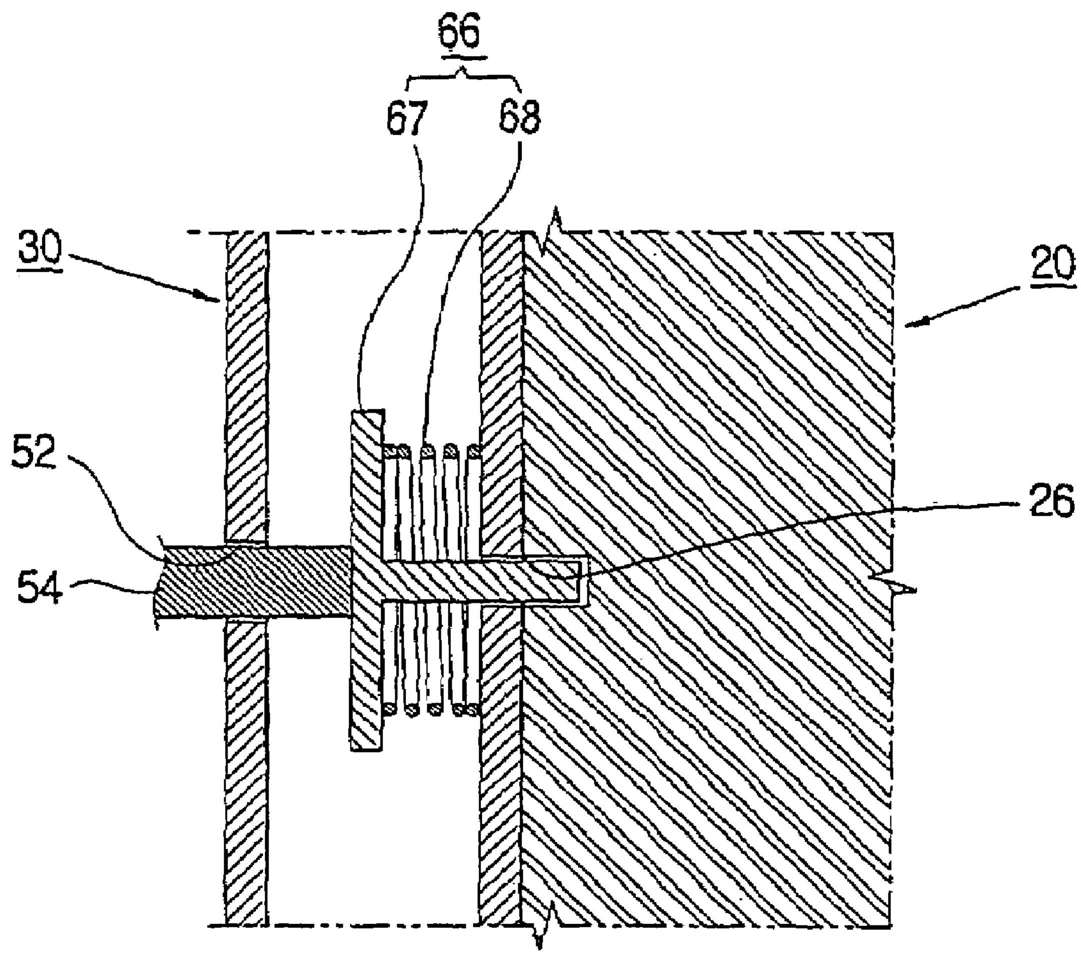

As shown in FIGS. 5A and 5B, a pin member 66 may be provided independently of the first connecting protrusion 54. The pin member 66 includes an elastic material 67 provided inside of the handle 30, and a spring supporting pin 68 provided at the elastic material 67, to be selectively inserted in the pin supporting hole 26 according to a movement of the elastic material 67 that moves according to whether the first connecting protrusion 54 is inserted in the first connecting hole 52.

The second connector 60 includes a second connecting hole 62 selectively provided at one of the monitor main body 20 and the supporting stand 40, and a second connecting protrusion 64 provided at the other of the monitor main body 20 and the supporting stand 40, to be inserted in the second connecting hole 62. In the present invention, the second connecting hole 62 is provided at the monitor main body 20 and the second connecting protrusion 64 is provided at the supporting stand 40.

The second connector 60 may preferably be positioned at opposite sides of the connector combining part 22 of the main body 20, to firmly connect the monitor main body 20 with the supporting stand 40.

In light of the above-described configuration, the tablet monitor according to the embodiment of the present invention is combined as follows.

The second connecting protrusion 64 of the supporting stand 40 is inserted in the second connecting hole 62 provided on the bottom of the rear of the monitor main body 20. At the same time, the first protrusion 54 of the supporting stand 40 is inserted in the first connecting hole 52 provided in the handle 30, thereby firmly connecting the monitor main body 20 with the supporting stand 40. During this process, the connector combining part 22 of the monitor main body 20 and the connector 42 of the supporting stand 40 are connected to each other.

Further, the first connecting protrusion 54 of the supporting stand 40 is inserted in the first connecting hole 52 provided in the handle 30, so that the pin member 56 moves up, and then, is inserted in the pin supporting hole 26 on the handle accommodating part 24. Through this process, the handle 30 is connected to the monitor main body 20.

If the first connecting protrusion 54 comes out of the first connecting hole 52, the pin member 56 elastically moves down, so that the handle 30 is separated from the monitor main body 20. Thus, the handle 30 may be folded.

As is described above, according to the present invention, the monitor main body and the supporting stand may be simply and firmly connected to each other, so that the tablet monitor is used with more convenience.

Further, at the same time, when the monitor main body and the supporting stand are connected to each other, the handle may be connected to the monitor main body.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A tablet monitor, comprising:

a monitor main body comprising a connector combining part and a handle accommodating part;

a handle foldably accommodated in the handle accommodating part of the monitor main body;

a supporting stand connected to a rear of the monitor main body to support the monitor main body, and including a connector connected to the connector combining part of the monitor main body;

a first connector having two parts, respectively provided at the handle and the supporting stand, and each having a shape to correspond to each other to be detachably connected to each other; and a second connector having two parts, respectively provided at the monitor main body and at the supporting stand, and each having a shape to correspond to each other to be detachably connected to each other.

2. The tablet monitor according to claim 1, wherein the first connector comprises:

a first connecting hole provided in a middle of the handle; and a first connecting protrusion provided on the supporting stand, to be inserted in the first connecting hole.

3. The tablet monitor according to claim 2, wherein the first connector further comprises:

a pin member provided inside of the handle and elastically moved according to whether the first connecting protrusion is inserted in the first connecting hole, to be selectively inserted in a pin supporting hole of the monitor main body.

4. The tablet monitor according to claim 3, wherein the pin member comprises:

an elastic material provided inside of the handle and elastically moved according to whether the first connecting protrusion is inserted in the first connecting hole; and a supporting pin moved together with the elastic material, to be selectively inserted in the pin supporting hole of the monitor main body.

5. The tablet monitor according to claim 1, wherein the second connector comprises:

a second connecting hole selectively provided at one of the monitor main body and the supporting stand; and a second connecting protrusion provided at the other of the monitor main body and the supporting stand, to be inserted in the second connecting hole.

6. The tablet monitor according to claim 2, wherein the second connector comprises:

a second connecting hole selectively provided at one of the monitor main body and the supporting stand; and a second connecting protrusion provided at the other of the monitor main body and the supporting stand, to be inserted in the second connecting hole.

7. The tablet monitor according to claim 3, wherein the second connector comprises:

a second connecting hole selectively provided at one of the monitor main body and the supporting stand; and a second connecting protrusion provided at the other of the monitor main body and the supporting stand, to be inserted in the second connecting hole.

8. The tablet monitor according to claim 4, wherein the second connector comprises:

a second connecting hole selectively provided at one of the monitor main body and the supporting stand; and a second connecting protrusion provided at the other of the monitor main body and the supporting stand, to be inserted in the second connecting hole.

9. The tablet monitor according to claim 1, wherein the first connector is provided to connect the monitor main body and the supporting stand to each other, and to connect the handle to the monitor main body.

10. A tablet monitor having a monitor main body, a handle provided on the monitor main body, and a supporting stand, the tablet monitor comprising:

a first connector having two parts, respectively provided at the handle and the supporting stand, and each having a shape to correspond to each other to be detachably connected to each other; and a second connector having two parts, respectively provided at the monitor main body and at the supporting stand, and each having a shape to correspond to each other to be detachably connected to each other, allowing the monitor main body and the supporting stand to be firmly connected to each other.

11. A tablet monitor having a handle and a supporting stand, comprising:

a monitor main body in which the handle is provided thereon and the supporting stand is connected thereto;

a first connector having two parts, respectively provided at the handle and the supporting stand, and each having a shape to correspond to each other to be detachably connected to each other; and a second connector having two parts, respectively provided at the monitor main body and at the supporting stand, each having a shape to correspond to each other to be detachably connected to each other, allowing the monitor main body and the supporting stand to be firmly connected to each other.

12. A tablet monitor having a monitor main body and supporting stand, comprising:

a handle provided on the monitor main body;

a first connector having two parts, respectively provided at the handle and the supporting stand, and each having a shape to correspond to each other to be detachably connected to each other; and a second connector having two parts, respectively provided at the monitor main body and at the supporting stand, each having a shape to correspond to each other to be detachably connected to each other, allowing the monitor main body and the supporting stand to be firmly connected to each other.

* * * * *